(12) United States Patent
Akkipeddi et al.

(10) Patent No.: US 7,127,949 B2
(45) Date of Patent: Oct. 31, 2006

(54) CONTACT PRESSURE SENSOR AND METHOD FOR MANUFACTURING THE SAME

(75) Inventors: Ramam Akkipeddi, Singapore (SG); Christopher P Sperring, Singapore (SG); Siew Lok Toh, Singapore (SG); Cho Jui Tay, Singapore (SG); Mustafizur Rahman, Singapore (SG); Soo Jin Chua, Singapore (SG)

(73) Assignee: National University of Singapore, Singapore (SG)

( * ) Notice: Subject to any disclaimer, the term of this patent is extended or adjusted under 35 U.S.C. 154(b) by 152 days.

(21) Appl. No.: 10/615,413

(22) Filed: Jul. 8, 2003

(65) Prior Publication Data

US 2005/0007721 A1 Jan. 13, 2005

(51) Int. Cl.
*G01B 7/16* (2006.01)
(52) U.S. Cl. ............................................. 73/777
(58) Field of Classification Search ................ 73/777, 73/862.391
See application file for complete search history.

(56) References Cited

U.S. PATENT DOCUMENTS

| | | | | |
|---|---|---|---|---|
| 3,585,415 A | * | 6/1971 | Muller et al. ............. | 310/319 |
| 4,657,775 A | | 4/1987 | Shioiri et al. | |
| 4,758,896 A | * | 7/1988 | Ito ............................. | 348/790 |
| 4,786,887 A | | 11/1988 | Bringmann et al. | |
| 4,965,697 A | | 10/1990 | Mosser et al. | |
| 5,248,912 A | * | 9/1993 | Zdeblick et al. ............ | 310/332 |
| 5,429,993 A | * | 7/1995 | Beitman ...................... | 438/52 |
| 5,518,951 A | | 5/1996 | Paynter et al. | |
| 5,894,161 A | * | 4/1999 | Akram et al. ................. | 257/48 |
| 5,935,641 A | * | 8/1999 | Beam et al. ................. | 427/100 |
| 5,962,118 A | | 10/1999 | Burgess | |
| 6,022,756 A | | 2/2000 | Sparks et al. | |
| 6,555,946 B1 | * | 4/2003 | Finder et al. ............... | 310/324 |

FOREIGN PATENT DOCUMENTS

| | | |
|---|---|---|
| EP | 0 561 397 | 11/1996 |
| GB | 2 310 288 | 8/1997 |
| JP | 06-213613 | 8/1994 |
| JP | 2000-315805 | 11/2000 |

OTHER PUBLICATIONS

Demeester et al., "Epitaxial lift-off and its applications," Semiconductor Science and Technology, 1993, vol. 8, pp. 1124-1135.

* cited by examiner

*Primary Examiner*—Max Noori
(74) *Attorney, Agent, or Firm*—Dinsmore & Shohl LLP

(57) ABSTRACT

A contact pressure sensor (10) and method for manufacturing a contact pressure sensor for detecting contact pressure between two surfaces is disclosed. The contact pressure sensor disclosed comprises a substrate (40) for supporting the sensor and a contact pressure sensitive layer (26) sensitive to pressure applied to the contact pressure sensor. The method disclosed also comprises transferring a process post structure (8) that is formed on a first process support substrate (20) from the first process support substrate to a second contact pressure sensor support substrate (40).

12 Claims, 4 Drawing Sheets

CONTACT PRESSURE SENSOR AND METHOD FOR MANUFACTURING THE SAME

FIELD OF THE INVENTION

The invention generally relates to pressure sensors, and more particularly, to piezo-resistive based contact pressure sensors used to monitor contact pressures between two surfaces.

BACKGROUND

Contact pressure sensors are used to measure contact pressures between two surfaces. Knowledge of the pressure that exists between two surfaces may be beneficial for many applications. One application exists between the flanges and gasket surfaces in a pipeline. Uneven tightening of bolts may distort the joints and cause leakage. Furthermore, due to various forces acting on the joint, the relaxation of joints etc., it is important to have real time information of the pressure distribution at the mating surfaces of the joints.

For epitaxial film materials such as AlGaAs, the material of substrate wafer used is Gallium Arsenide (GaAs). Contact pressure sensors are based on solid state physics of the pressure sensitivity of semi-conductor elements from columns IIIB and VB of the Mendeleev table. Different column elements are combined, and are grown epitaxially (lattice-matched) on a single substrate. Once contact pressure is applied to the material a difference in resistance can be measured. Additionally, linearity response can be detected to pressure variations by direct contact instead of by hydrostatic means.

Contact pressure sensors to date have typically been made using piezo-resistivity property of Aluminum Gallium Arsenide (AlGaAs) material, an epitaxial film. Of course, the wafer substrate that the epitaxial film is grown has the same lattice structure as the epitaxial film.

An example of a contact pressure sensor using materials with piezo-resistive properties is a meander resistor which is formed by the conventional fabrication processes, like photolithography, etching and metallization.

A type of solid state pressure sensor of AlGaAs is disclosed in U.S. Pat. No. 4,965,697, however, the sensor is based on hydrostatic pressure principles and limited to configurations employing hydrostatic applications.

Various attempts have been performed to overcome the problem of limited pressure values achievable in contact mode. These include (a) thinning of GaAs substrate, (b) enclosing chips in a silicon gel-material to shield the devices and (c) reducing the chip size. However the problem of the chips breaking under high pressures still occurs. Thus, a need exists for a contact pressure sensor to monitor pressure distribution between two surfaces that can withstand direct contact pressures.

SUMMARY

An aspect of the invention is a contact pressure sensor comprises a substrate for supporting the sensor, a contact pressure sensitive layer having a material with piezo-resistive properties sensitive to pressure applied to the contact pressure sensor, the contact pressure sensitive layer having lattice structure different to the substrate; an insulation layer disposed between the substrate and the contact pressure sensitive layer and for supporting the contact pressure sensitive layer on the sensor; and a conductive layer disposed on the contact pressure sensitive layer for a conductive contact for the sensor.

In an embodiment, the material of the contact pressure sensitive layer may be a semi-conductor element from columns IIIA and VA of the Mendeleev table.

In another embodiment, the material of the contact pressure sensitive layer is a ternary semi-conductor element from columns IIIA and VA of the Mendeleev table.

In another embodiment the material of the contact pressure sensitive layer comprises more than one layer of different elements from columns IIIB and VB of the Mendeleev table.

In another embodiment the material of the contact pressure sensitive layer is Aluminium Gallium Arsenide (AlGaAs).

In another embodiment, the contact pressure sensor further comprising a temperature sensitive layer having a material with piezo-resistive properties sensitive to temperature disposed on the substrate; and an additional insulation layer disposed between the temperature sensitive layer and the pressure sensitive layers wherein the additional insulation layer has a resistance greater than either of the temperature sensitive layer and the pressure sensitive layer.

Another aspect of the invention is a method of making a contact pressure sensor comprising providing a first support substrate and a second support substrate, each having different lattice structures; forming a process post structure comprising: depositing an insulation layer on the first support substrate; depositing a pressure sensitive layer having a material with piezo-resistive properties sensitive to pressure applied to the contact pressure sensor disposed on the insulation layer, the pressure sensitive layer having a lattice structure different than the second substrate; and depositing a conductive layer on the contact pressure sensitive layer for a conductive contact for the sensor; and transferring the process post structure from the first substrate to the second substrate.

In an embodiment, the process post structure may further comprise depositing a sacrificial layer on a surface of the first support wherein the sacrificial layer is disposed between the first substrate and the insulation layer. The transferring of the process post structure may further comprise removing the sacrificial layer from the process post structure.

In another embodiment the forming a process post structure may further comprise depositing a temperature sensitive layer having a material with piezo-resistive properties sensitive to temperature also disposed on the substrate; and depositing an additional insulation layer disposed between the temperature sensitive layer and the pressure sensitive layers wherein the additional insulation layer has a resistance greater than either of the temperature sensitive layer and the pressure sensitive layer.

BRIEF DESCRIPTION OF THE DRAWINGS

These and other features, objects, and advantages of embodiments of the invention will be better understood and readily apparent to one of ordinary skill in the art from the following description, in conjunction with drawings, in which.

DETAILED DESCRIPTION

Figure 3A:
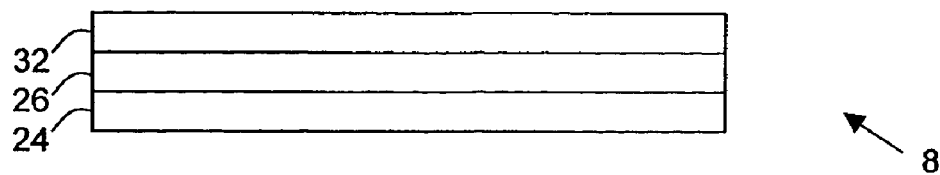
FIG. 3A–C show cross-sectional views during stages of the process of manufacturing in accordance with an embodiment of the invention.
Figure 3B:
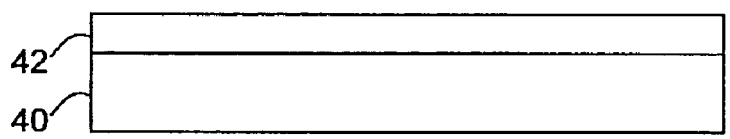
Figure 3C:
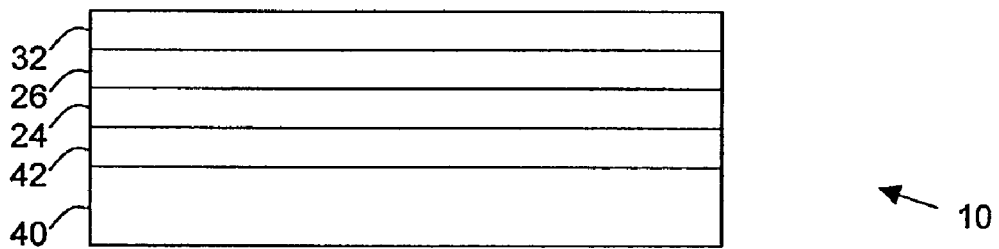
Figure 4:
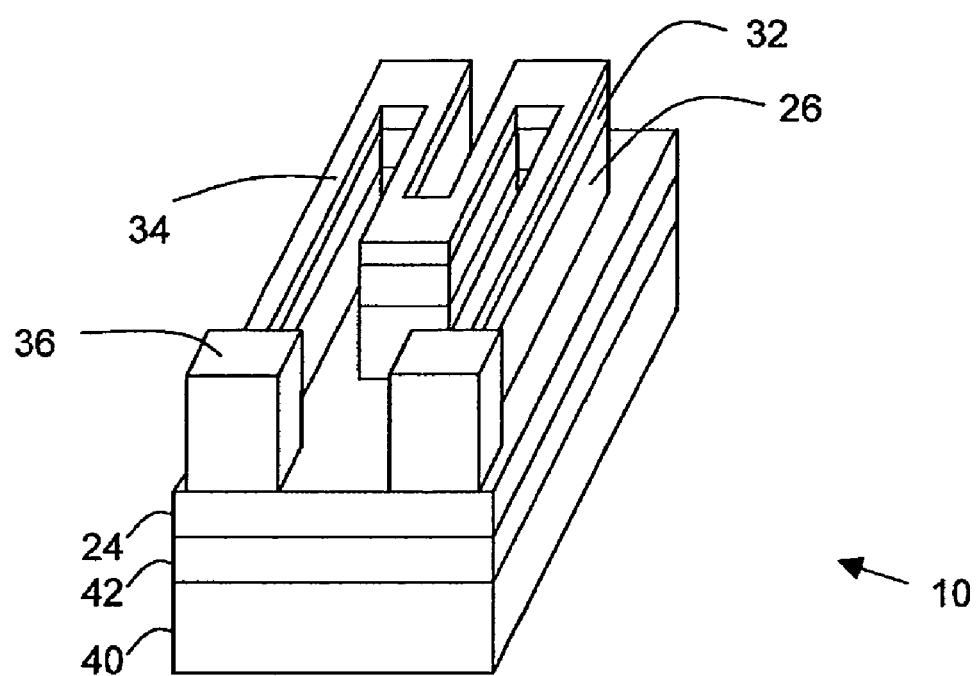
FIG. 4 shows a perspective view of an embodiment of the invention after the process of manufacturing in accordance with an embodiment of the invention.
Figure 5:
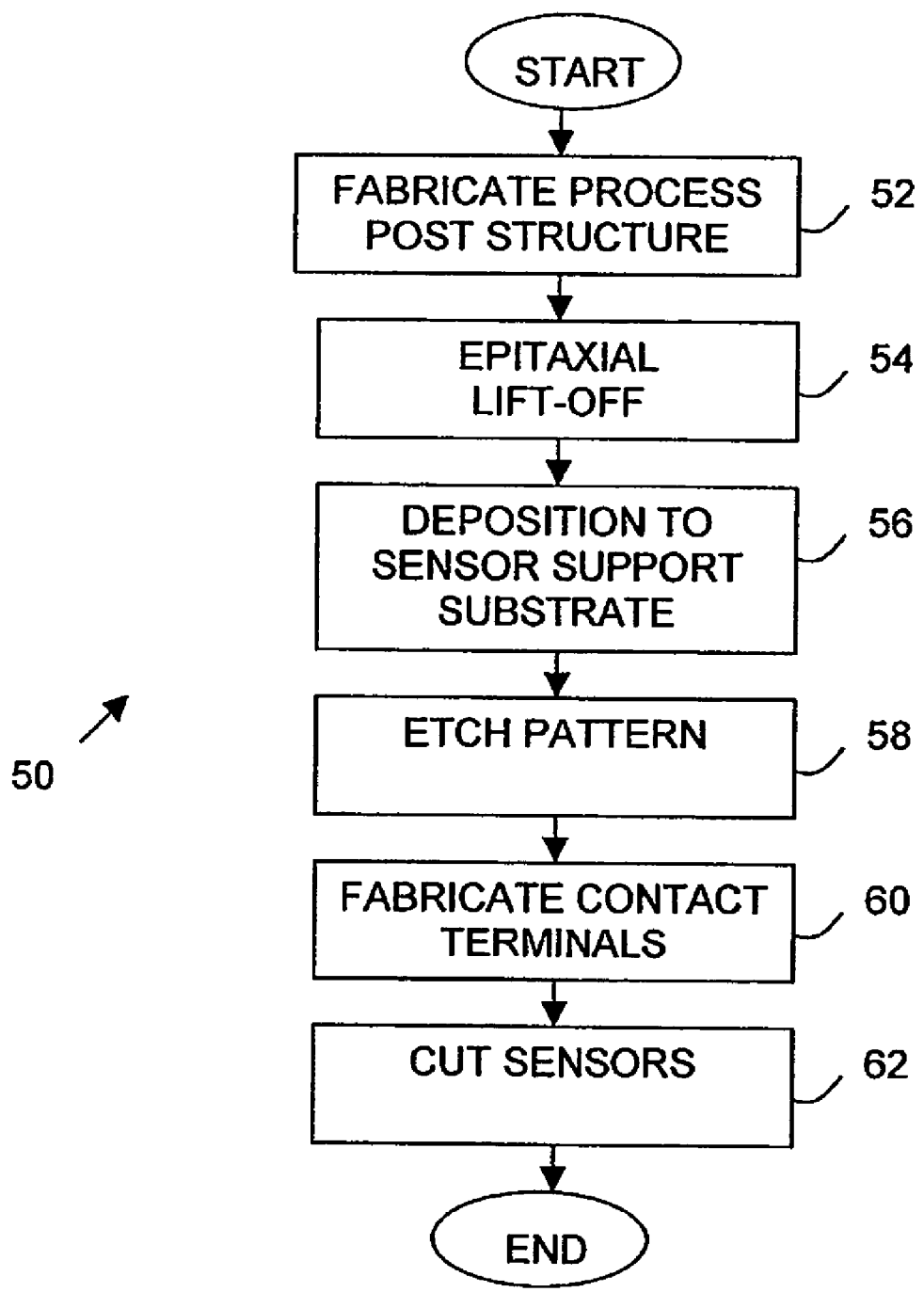
FIG. 5 shows a flow chart of a method in accordance with an embodiment of the invention.

A sensor 10 is shown in FIGS. 3C and 4 and a method 50 for manufacturing a sensor is shown in FIG. 5 to monitor the contact pressure distribution between two surfaces in contact. For example, an application exists between flange and gasket surfaces in a pipeline. Additionally, a number of points of contact between the two surfaces may be monitored by a number of sensors. In the application between the flange and gasket surfaces of a pipeline, a sensor or a plurality of sensors may be positioned proximate to critical areas of either surface, such as each bolt of the joint along a pipeline. Of course, there are many more applications that exist where the knowledge of the direct contact pressure between two surfaces in contact would be beneficial.

The contact pressure sensor is based on the knowledge of solid state physics, particularly the pressure sensitivity of structures made from semi-conductor elements, especially from columns IIIA and VA of the Mendeleev table. Different column elements are combined, and are grown epitaxially (lattice-matched) on a single substrate. Once contact pressure is applied to the material a difference in resistance can be measured.

Figure 1:
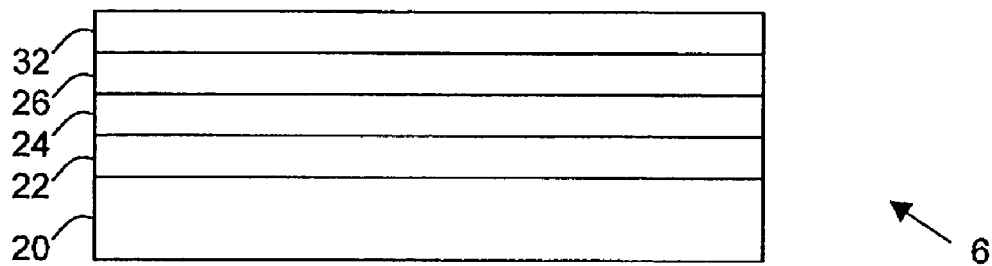
FIG. 1 shows a cross-sectional view during a stage of the process of manufacturing in accordance with an embodiment of the invention.
Figure 2:
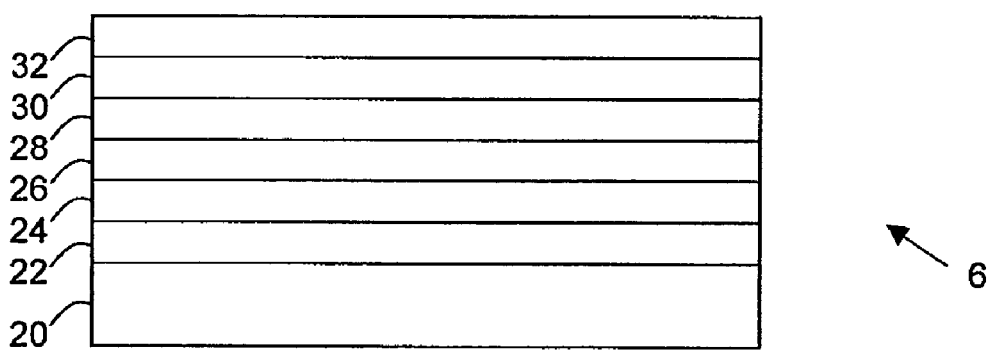
FIG. 2 shows a cross-sectional view during a stage of the process of manufacturing in accordance with another embodiment of the invention.

Additionally, linearity response can be detected to pressure variations by direct contact instead of by hydrostatic means. The contact pressure sensor in accordance with an embodiment of the invention is shown in FIG. 4. The sensor shown is more particularly concerned with the use of multiple layers of materials typically but not exclusively, n-type (creating an excess of electrons) AlxGa1-xAs as a pressure sensing material epitaxially grown on undoped or semi-insulating substrates, as shown in FIGS. 1 and 2, epitaxially lifted off and deposited onto a more robust material, as shown in FIG. 3A–C. Each of the layers for fabricating the process post structure 6,8 are epitaxial film grown by, for example, molecular beam epitaxy (MBE) technique on the process support substrate 20.

Referring to FIG. 1, a cross-sectional view of an embodiment of a process structure 6 is shown and fabricated 52. A process support substrate 20 supports the formation of the layers of the process post structure 8 during processing. The process support substrate 20 such as Gallium Arsenide (GaAs) wafer 20 is taken as a base. A first layer 22 grown or deposited onto one face of the process support substrate 20, and is a sacrificial layer that is sacrificed during the process of transfer of the process post structure 8 to the sensor support wafer 40 discussed below. The sacrificial layer 22 is a material that may be easily removed during the transfer process. Such a material for the sacrificial layer is Aluminium Arsenide (AlAs) with a thickness of, but not exclusively, 800 Å.

A second layer 24 that acts as support layer for all other subsequent layers in the process post structure 8 is deposited onto the sacrificial layer 22. The support layer 24 is a material such as GaAs with a thickness of but not exclusively 30,000 Å.

A third layer 26 that acts as a pressure sensitive layer in the contact pressure sensor 10 is deposited on the support layer 24. The pressure sensitive layer 26 is a semi-conductor element such as elements from columns IIIA and VA of the Mendeleev table, for example, n-type Aluminium Gallium Arsenide (AlxGa1-xAs, or n-type $Al_xGa_{1-x}As$) with a thickness of but not exclusively 10,000 Å, and consists of but not exclusively about 30% Al.

A fourth layer 32 acts as a conductive or ohmic contact layer for the contact pressure sensor 10 is deposited on the pressure sensitive layer 26. The conductive layer 32 is a material with conductive properties such as doped GaAs with a thickness of, but not exclusively, 500 Å.

Referring to FIG. 2, for a sensor requiring other sensing monitoring such as temperature compensation within the sensor, additional layers 28,30 may be disposed in the process structure 6 during processing. The sensing sensitive material 26,30 may be disposed in any order, as long as the sensing sensitive materials are insulated by insulating layers 24,28. However, the insulation resistance of the insulator layers between the sensing sensitive layers must be greater than the combined resistance of the sensing sensitive layers. For example, another insulating layer 28 is grown or deposited directly onto the pressure sensitive layer 26, which is undoped GaAs with a thickness of, but not exclusively, 30,000 Å. A temperature sensitive layer 30 is grown or deposited on the insulating layer 28, and is n-type $Al_xGa_{1-x}As$ with a thickness of but not exclusively, 10,000 Å. Conveniently, by selecting the correct value of 'x' in the n-type AlxGa1-xAs the sensitivity of the AlGaAs material will either be pressure sensitive or temperature sensitive. The conductive layer 32 is then grown or deposited on the temperature sensitive layer 30 in the same manner as described above.

It will be appreciated that the values and choice of materials used in the above embodiments are provided as examples. Of course, depending on the specific application, the choice of materials, specific content of materials, and dimensions such as thickness of layers may differ accordingly.

Once the basic process post structure is complete as shown in FIG.1 or FIG.2, as described above, a second stage 54 of the manufacture process is shown in FIG. 3A–C. The second stage of the process is required to separate the process structure 6 (layers 24,26,32 or 24,26,28,32) as one unit from the original substrate base 20. This process is shown in FIG. 3A–C, showing the process structure 6 as formed in FIG. 1 to form process post structure 8 of FIG. 3A and sensor 10 of FIG. 3C. However, it will be apparent that the same transfer process 54 may be applied to other embodiments and variations of the process structure 6, including the embodiment of FIG. 2. This process may be known as epitaxial lift off (ELO) 54, also known as peeled film technology.

During either of these processes the sacrificial layer 22 of for example AlAs is sacrificed. This sacrificial layer is dissolved by means of a process such as chemical etching in a solution of hydrofluoric acid leaving a remainder of layers 24,26,32 as one unit, the process post structure 8 as shown in FIG. 3A.

These structure of layers that are lifted off 54 as one unit are then transferred or grafted 56 to another more robust substrate 40 to form a basic final layer structure. The new substrate 40 may be any type of material that is more robust than the first substrate 20, such as for example a metal, insulator, semiconductor, or the like. If the surface texture and or flatness of this new substrate layer 8 is within certain required limits, a method known as the "van der Waals" (vdw) bonding process can be adopted. Such a limits and transfer process is discussed in the article, Demeester et al. "Epitaxial Lift-Off and its Applications", Semicond. Sci. Technol. 8 (1993) p 1124–1135, and is incorporated herein by reference. If the surface texture of the sensor support substrate 40 does not have a suitable surface texture, or it has conductive properties, an intermediate insulation layer 42, such as but not exclusively a polyimide, will need to be deposited to form an insulation layer onto the new substrate 40 prior to depositing the lifted off material layers of the process post structure 8 as shown in FIG. 3B Generally, the majority of insulating materials are more brittle than conducting metals. If a metal is chosen as a new substrate a coating of insulating material such as a polyimide will have to be deposited to the face of the said metal forming an insulation barrier between the metal and the sensor. A photoresist layer which helps in a uniform delineation from the host substrate is also used as a supporting layer during the lift-off process. As the new substrate 40 is chosen to have more robust qualities to withstand higher contact pressures, the lattice structure, i.e. the periodic or regular arrangement of atoms, ions or molecules of the new substrate 40 differs from the lattice structure of the more brittle removed or replaced first process substrate 20.

The next process stage 58 after the layers are grown and the transfer is complete, may include a masking material 58 in the pattern formed by such as a photoresitive polyimide 34 may be defined on the surface of the conductive layer 32 by photolithography. This process is conducted to create a mesa. The meander pattern 34 is for increasing the sensitivity of the sensor. The mesa should be etched 58 to a depth below the l vel of the pressure sensitive layer 26 $Al_xGa_{1-x}As$ into the insulation layer 24 to an order of but not exclusively to 1,000 Å. Upon completion of the etching process the masking material 34 is removed. Of course the depth of the mesa will be determined by the thickness of the conductive, pressure sensitive, and insulation layers 32,26,24. The meander pattern 34 shown in FIG. 4 is provided as an example for illustration purposes, and it will be appreciated that different photomasks of meander designs may be chosen for different resistance values and different sensitivities required and aligned onto the face of layer 32 depending on specific applications. The meander lines may be terminated with ohmic contact pads 36 which may also serve as bond pads for further wire bonding. Connection is made to each end of the said meander pattern for measuring changes in resistance in pressure sensing layer 26 due to changes in contact pressure, and if present temperature sensing layer 30 to monitor changes in temperature.

The varied applications of the sensor will dictate the type and size of contacts 36 built 60 at each end of the meander pattern. Of course, the contacts 36 shown in FIG. 4 are provided as an example for illustration purposes, and it will be appreciated that electrical connection 60 may be made in other forms. For example if the process post structure 8 is transferred to another substrate having circuitry thereon, or formed thereon after the transfer, the need for any type of wire bonding process is eliminated.

The electrical circuitry used to connect to and drive the contact pressure sensor is not shown, however, such circuitry would be well known. For example the circuitry may comprise of a power source such as a constant voltage power source with positive terminal connected to one contact of the sensor and the negative terminal connected to the other contact, or the negative terminal and other contact to ground. Additionally, it will be known that other components in the electrical circuitry may be applied such as current detectors, and the like.

An additional protective layer such as a polyimide layer or passivation layer or the like may be applied to the complete sensor for protection purposes such as moisture for example. Individual sensors are cut into required sizes depending on their applications. After the formation of complete sensor devices, the samples are cut 62 into smaller pieces and are protected from the device side by wax. The process of bonding and measurements are then carried out on the sensor chip.

It will be appreciated that, although specific embodiments of the invention have been described herein for purposes of illustration, various modifications may be made without departing from the scope of the invention. Accordingly, the invention is not limited except by the appended claims.

What is claimed is:

1. A contact pressure sensor comprising:
    first and second contact surfaces for being subjected to a contact pressure force and counter-force respectively, the first and second contact surfaces being disposed substantially directly opposite to each other;
    a substrate disposed between the first and second contact surfaces;
    a contact pressure sensitive layer comprising a material with piezo-resistive properties, the contact pressure sensitive layer having a lattice structure different to the substrate and being disposed between the substrate and the first contact surface;
    a supporting layer disposed between the contact pressure sensitive layer and the substrate, the supporting layer having a lattice-matched structure to that of the contact pressure sensitive layer;
    a conductive layer disposed between the contact pressure sensitive layer and the first contact surface; and
    wherein the contact pressure sensor is arranged such that a pressure resulting from the contact pressure force and the counter-force is applied across the contact pressure sensitive layer.

2. A sensor according to claim 1 wherein the material of the contact pressure sensitive layer is a semi-conductor element from columns IIIA and VA of the Mendeleev table.

3. A sensor according to claim 2 wherein the material of the contact pressure sensitive layer is a ternary semi-conductor element from columns IIIA and VA of the Mendeleev table.

4. A sensor according to claim 1 wherein the material of the contact pressure sensitive layer comprises more than one layer of different elements from columns IIIA and VA of the Mendeleev table.

5. A sensor according to claim 1 wherein the material of the contact pressure sensitive layer is Aluminium Gallium Arsenide (AlGaAs).

6. A sensor according to claim 1 wherein the materials of the insulation layer is Gallium Arsenide (GaAs) and the conductive layer is doped Gallium Arsenide (GaAs).

7. A sensor according to claim 1 wherein the second contact surface comprises at least a portion of a surface of the substrate facing away from the contact pressure sensitive layer.

8. A sensor according to claim 1 wherein the supporting layer is semi-insulating or insulating.

9. A sensor according to claim 1 wherein a meander pattern is etched on the conductive material to increase the sensitivity of the contact pressure sensor.

10. A sensor according to claim 1 wherein the sensor is arranged to withstanding contact pressure of greater than 40 MPa.

11. A sensor according to claim 1 wherein the material of the substrate is more robust than a material which is lattice matched with the contact pressure sensitive layer.

12. A contact pressure sensor comprising:

first and second contact surfaces for being subjected to a contact pressure force and counter-force respectively, the first and second contact surfaces being disposed substantially directly opposite to each other;

a substrate disposed between the first and second contact surfaces;

a contact pressure sensitive layer comprising a material with piezo-resistive properties, the contact pressure sensitive layer having a lattice structure different to the substrate and being disposed between the substrate and the first contact surface;

a supporting layer disposed between the contact pressure sensitive layer and the substrate, the supporting layer having a lattice-matched structure to that of the contact pressure sensitive layer;

a conductive layer disposed between the contact pressure sensitive layer and the first contact surface; and a temperature sensitive layer having a material with piezo-resistive properties sensitive to temperature and disposed between the first and second contact surfaces, the temperature sensitive layer having a lattice structure different to the substrate; and an additional insulation layer disposed between the temperature sensitive layer and the pressure sensitive layer wherein the additional insulation layer has a resistance greater than either of the temperature sensitive layer and the pressure sensitive layer, wherein the contact pressure sensor is arranged such that a pressure resulting from the contact pressure force and the counter-force is applied across the contact pressure sensitive layer.

* * * * *